United States Patent [19]

Vesely et al.

[11] Patent Number: 5,086,463
[45] Date of Patent: Feb. 4, 1992

[54] VANDAL-RESISTANT COMMUNICATIONS STATION

[76] Inventors: Kevin T. Vesely, 100 Edinburgh Rd., Middletown, N.Y. 10940; John J. McMonagle, Jr., 1369 E. 84th St., Brooklyn, N.Y. 11236

[21] Appl. No.: 415,782

[22] Filed: Oct. 2, 1989

[51] Int. Cl.⁵ .................... H04M 1/04; H01H 13/04
[52] U.S. Cl. ............................ 379/388; 379/40; 379/45; 379/355; 379/387; 379/37; 200/341; 200/345
[58] Field of Search .............. 379/45, 40, 37, 355, 379/356, 357, 359, 354, 387, 388; 200/341, 345

[56] References Cited

U.S. PATENT DOCUMENTS

| | | | |
|---|---|---|---|
| 3,009,023 | 5/1959 | Ruth | 379/37 |
| 3,391,256 | 7/1968 | Nawman . | |
| 3,398,244 | 8/1968 | Ertl et al. . | |
| 3,707,607 | 12/1972 | Reddick | 374/37 |
| 3,752,927 | 8/1973 | Bartley et al. . | |
| 3,800,089 | 3/1974 | Reddick | 379/37 X |
| 4,037,067 | 7/1977 | Solomovitz . | |
| 4,151,380 | 4/1979 | Blomeyer et al. . | |
| 4,176,254 | 11/1979 | Tuttle et al. | 379/45 |
| 4,246,451 | 1/1981 | Nix . | |
| 4,254,308 | 3/1981 | Blomeyer et al. . | |
| 4,396,176 | 8/1983 | Hanulla . | |
| 4,480,163 | 10/1984 | Morris et al. | 200/345 X |
| 4,518,826 | 5/1985 | Caudill et al. | 379/437 |
| 4,555,600 | 11/1985 | Morse . | |
| 4,724,538 | 2/1988 | Farrell | 379/45 X |
| 4,788,711 | 11/1988 | Nasco, Jr. | 379/45 X |
| 4,794,215 | 12/1988 | Sawada et al. | 200/345 |
| 4,822,963 | 4/1989 | Martin | 200/341 X |
| 4,866,764 | 9/1989 | Barker, III | 379/355 |

*Primary Examiner*—James L. Dwyer
*Assistant Examiner*—M. Shehata
*Attorney, Agent, or Firm*—Curtis, Morris & Safford

[57] ABSTRACT

A vandal-resistant telephone communications station having a one-piece face plate enclosure with a speaker phone aperture and a plurality of additional apertures therein. A plurality of call push-buttons and an answer push-button are respectively carried in the additional apertures. These buttons are of unique construction and are provided with resilient seals to prevent the insertion of foreign matter around the button, and each button is spring biased to its inoperative position. The call push-buttons control automatic signalling units within the face plate enclosure, and these units automatically generate an output signal at the location being called only during the time the push-button is held in its operative position. The answer push-button operates in similar fashion and is used to respond to an incoming call.

19 Claims, 3 Drawing Sheets

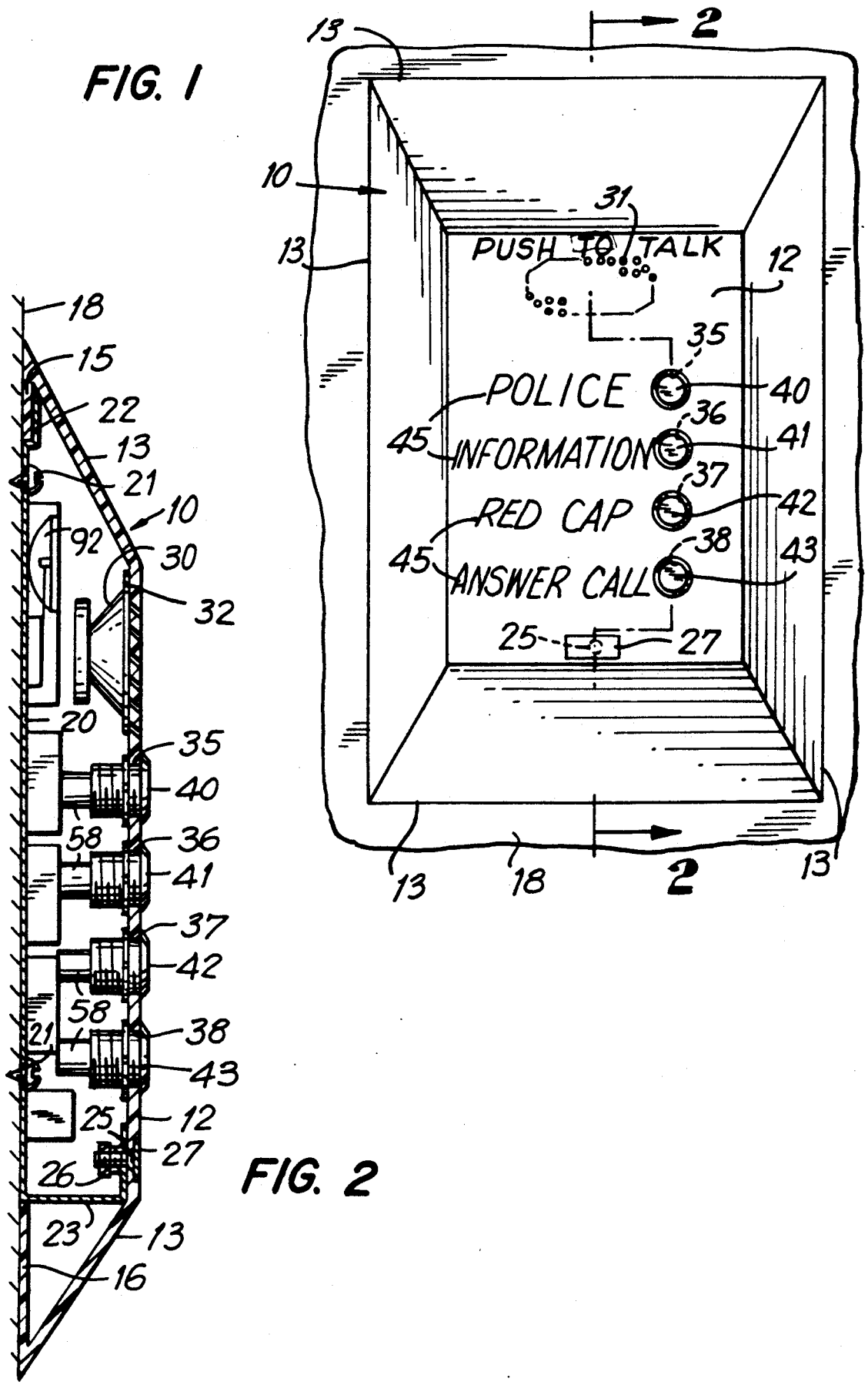

VANDAL-RESISTANT COMMUNICATIONS STATION

BACKGROUND OF THE INVENTION

This invention relates to communications stations and more particularly to such stations that are highly resistant to vandalism.

The present invention, while of general application, is particularly well suited for use as a telephone station at a public facility such as a bus terminal, airport or railroad depot, for example. It is common practice at such facilities to provide a series of telephone stations to enable members of the public to request police or other assistance, to ask for information, or to otherwise communicate with a remote location. For the most part the telephone stations utilized heretofore have included the usual handset and a dial or series of buttons to enable the caller to enter the number of the particular remote location with which communication is desired.

One of the more significant problems encountered with communications stations of the foregoing type has arisen from vandalism. With increasing frequency the handsets have been ripped off, the cords cut, and the dials or buttons rendered inoperative such as by inserting various instruments or a strong adhesive between the moving parts of the apparatus. Dialing instructions at the station have been defaced, and in some cases the cover has been pried loose and the interior components damaged or removed. These problems have necessitated frequent monitoring and maintenance of the individual stations and have resulted in various additional difficulties.

SUMMARY

One general object of the invention, therefore, is to provide a new and improved communications station which is particularly well suited for use at a public facility.

More specifically, it is an object of this invention to provide such a communications station which is highly resistant to vandalism.

Another object of the invention is to provide a communications station of the character indicated in which the buttons or other moving portions of the apparatus cannot be rendered inoperative through the use of various instruments, adhesive, etc.

A further object of the invention is to provide a vandal-resistant communications station which is economical to manufacture and thoroughly reliable in use.

In accordance with an illustrative embodiment of the invention, the communications station includes a face plate enclosure having a speaker aperture and a plurality of additional apertures which accommodate call push-buttons and an answer push-button. These push-buttons selectively actuate corresponding micro-switches which are connected in an electrical circuit within the enclosure. Upon the movement of a particular push-button to its operative position, the corresponding microswitches close the circuit to produce an output signal at a remote location only during the time the push-button is held in this position.

In accordance with one feature of the invention, in certain particularly important embodiments, the push-buttons are biased to their inoperative positions by a novel spring arrangement. The buttons are connected in a "push-to-talk" mode such that communication with the remote location can only be had during the time the buttons are held in their operative positions. No handsets are employed, and the possibility of a connection with the remote location being maintained after leaving the station is eliminated.

In accordance with another feature of several good arrangements in accordance with the invention, the electrical circuit includes a plurality of automatic signalling units for producing an output signal at a particular remote location only in response to the actuation of the call push-button corresponding to that location. The signalling unit automatically generates and transmits the number of the remote location without further intervention on the part of the individual making the call.

In accordance with still another feature of some embodiments of the invention, each of the push-buttons is of integral one-piece construction and is resiliently sealed in its corresponding aperture in the face plate. The configuration of the seal is such as to prevent the insertion of adhesive or other foreign matter in the aperture.

The present invention, as well as further objects and features thereof, will become more fully apparent from the following description of a preferred embodiment, when read with reference to the accompanying drawings.

BRIEF DESCRIPTION OF THE DRAWINGS

FIG. 1 is a front view of a vandal-resistant communications station in accordance with an illustrative embodiment of the invention.

FIG. 2 is a sectional view taken along the line 2—2 in FIG. 1.

DESCRIPTION OF A PREFERRED EMBODIMENT

Figure 3:
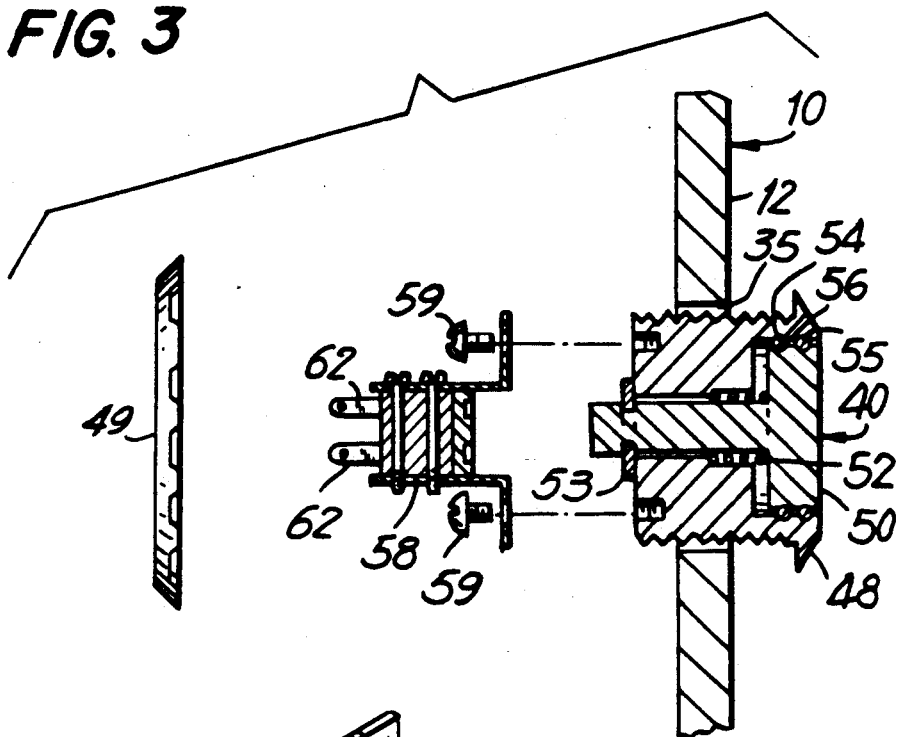
FIG. 3 is an exploded sectional view of one of the push-buttons shown in FIG. 1, together with certain cooperating components.
Figure 4:
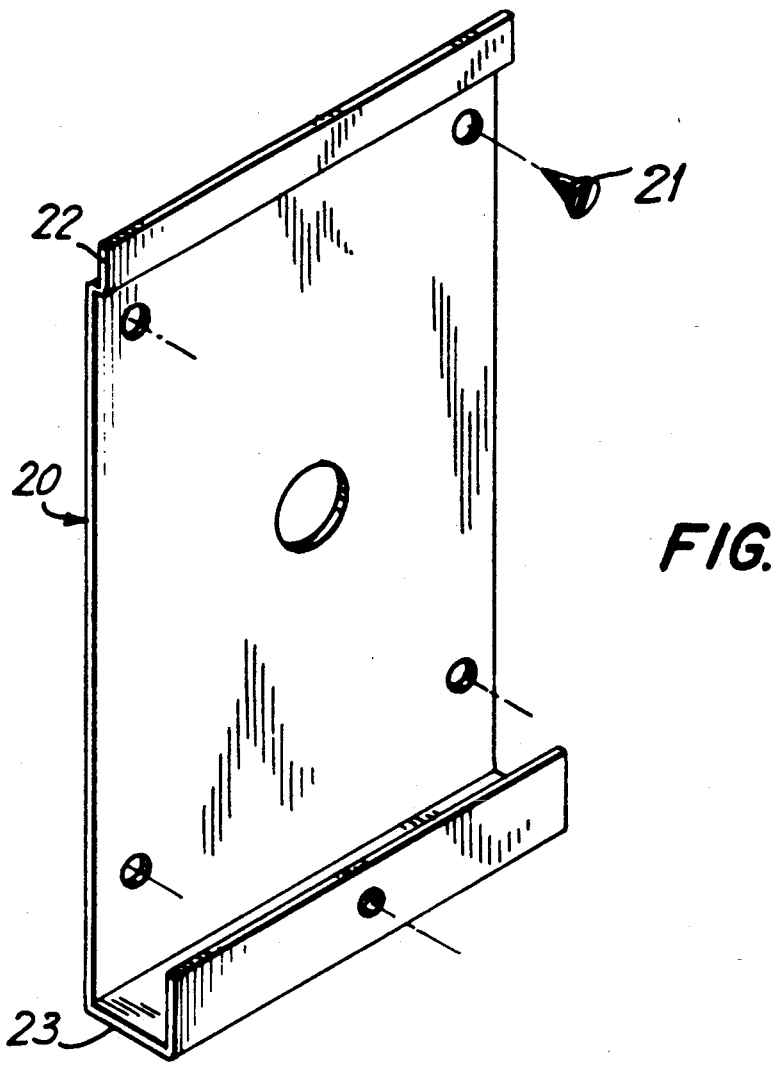
FIG. 4 is a perspective view of a mounting bracket for the station.

Referring to FIG. 1 of the drawings, there is shown a vandal-resistant communications station having a face plate enclosure indicated generally at 10. The enclosure 10 is of generally rectangular truncated configuration and has a flat vertical face 12 and four sloping side portions 13 with vertically extending flanges 15 and 16 (FIG. 2) formed on the upper and lower side portions, respectively. The periphery of the enclosure 10 is in the form of a sharp pointed edge. The enclosure advantageously is fabricated from brushed stainless steel or other relatively non-defacable material.

The face plate enclosure 10 is mounted on a wall 18 or other suitable supporting structure through the use of a mounting bracket 20. The bracket 20 is rectangular in shape and is suitably secured to the wall 18 by screws 21. The mounting bracket 20 is provided with an upper offset lip 22 and a lower ledge 23. To install the face plate enclosure 10, the upper flange 15 on the enclosure is inserted behind the offset lip 22, and the lower portion of the enclosure is placed over the ledge 23 such that the ledge serves as a spacer to make sure that the enclosure is flush with the wall 18. A single tamper-proof screw 25 adjacent the lower portion of the enclosure cooperates with a nut 26 welded on the flange to hold the enclosure in this position.

To provide even further security against the removal of the face plate enclosure 10 from the wall 18, in some embodiments a stainless steel cover 27 is adhesively secured in a mating recess to prevent access to the screw 25. An identifying extension number or other indicia for the station may be engraved on the cover.

Mounted within the upper portion of the face plate enclosure 10 is a speaker phone 30 of conventional construction. A series of speaker apertures 31 are formed in the enclosure 10 adjacent the speaker phone 30. These apertures slope downwardly, as seen in FIG. 2, and a fine mesh metallic screen 32 is located behind the apertures to prevent the insertion of sharp instruments or foreign materials into the apertures. The enclosure 10 also includes four additional apertures 35, 36, 37 and 38 which respectively accommodate push-buttons 40, 41, 42 and 43. The enclosure 10 is provided with engraved indicia 45 adjacent each of the push-buttons, and in the illustrated embodiment the button 40 is used to contact the police, the button 41 is used as an information button and the button 42 is used to summon a red oap. In a manner that will become more fully apparent hereinafter, the button 43 is used to answer a call from a remote location.

Each of the push-buttons 40, 41, 42 and 43 is of identical construction. As illustrated by the button 40 in FIG. 3, each button includes a threaded body portion 48 which fits within the corresponding aperture 35 and is held in place by a locking gasket 49 on the inside of the enclosure 10. A one-piece plunger 50 is reciprocably supported within the body portion 48 and is biased into its inoperative position by a coil spring 52. The plunger 50 is held in place by a snap ring 53. Two O-rings 54 and 55 of Teflon or similar material are positioned in spaced relationship with each other around the plunger 50, and a liberal layer of synthetic grease 56 is applied between the O-rings. The arrangement is such that the insertion of adhesive or other foreign matter between the plunger 50 and the body portion 48 is effectively prevented.

Each of the push-buttons 40, 41, 42 and 43 is provided with microswitches 58. The switches 58 are secured to the body portion 48 of the push-button by screws 59 and include six terminals 62 to provide a double pole double throw switch configuration. Upon actuation of the push-button, the microswitches 58 close a circuit between the terminals 62, and when the push-button is released this circuit automatically is interrupted as the spring 52 restores the button to its inoperative position.

Figure 5:
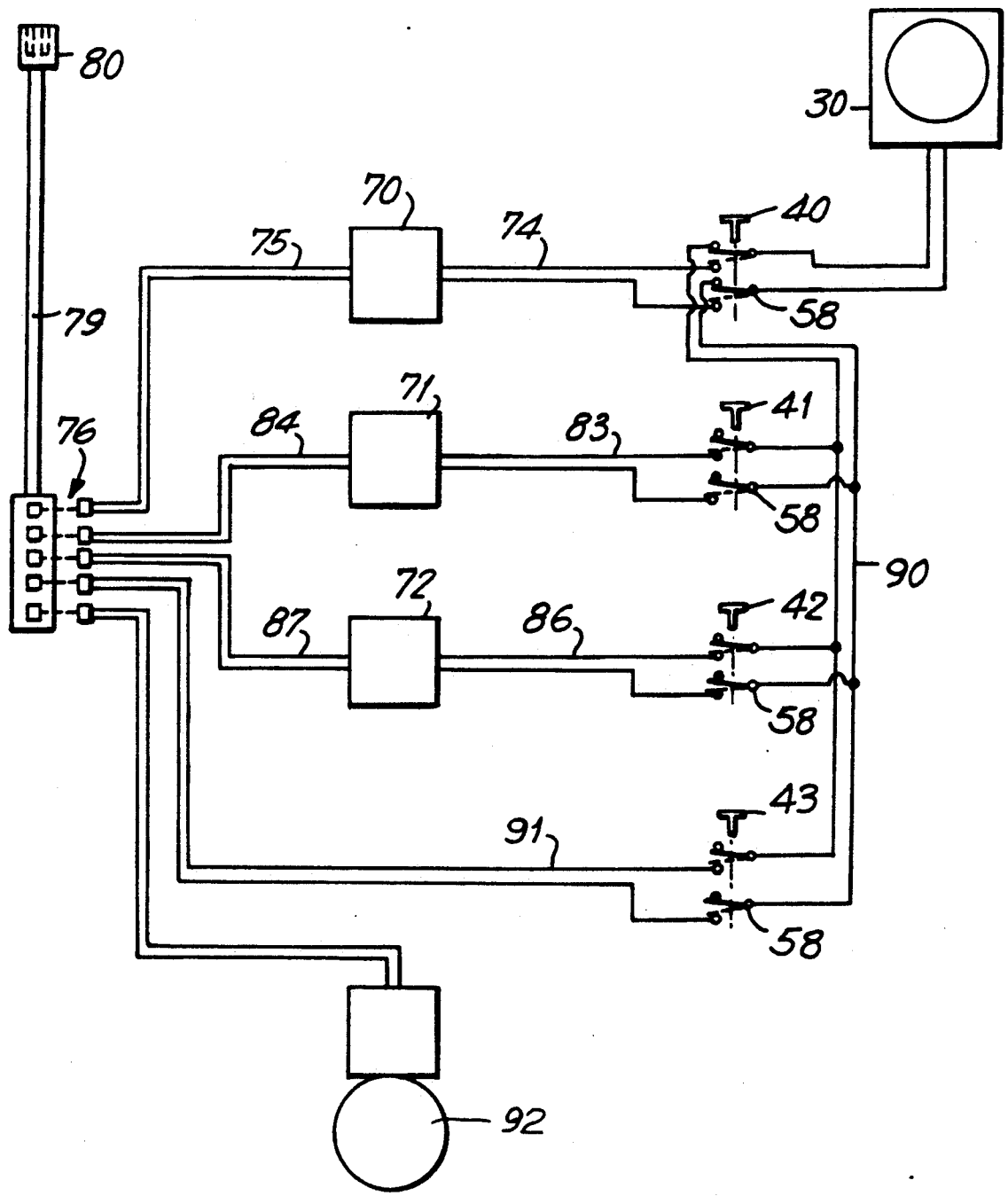
FIG. 5 is a schematic diagram of the electrical circuit for the station.

FIG. 5 is a schematic illustration of the electrical circuit for the communications station. The circuit is mounted entirely within the face plate enclosure 10 in electrical circuit relationship with the microswitches 58, and it includes three automatic signalling units 70, 71 and 72 for producing output signals at the remote location. The remote location may comprise the North American Telephone Network, a private branch exchange, a key system, intercom, etc. The units 70, 71 and 72 illustratively may be in the form of dialer cards available commercially from Viking Electronics Corp., model K1500, and are effective to transmit a series of digits or tones corresponding to the particular number of the remote location in response to a single input signal. The unit 70 is connected by leads 74 to the microswitches 58 for the police call button 40, and its output is connected by leads 75 to a terminal block 76. The block 76 in turn is connected by a cable 79 to the police at a remote location 80.

In a similar manner the signalling unit 71 is connected by leads 83 to the microswitches 58 for the information call push-button 41 and by leads 84 to the terminal block 76. Leads 86 connect the signaling unit 72 to the switch 58 for the red cap call push-button 42, and the output signals frmm the unit 72 are applied over leads 87 to the terminal block.

The microswitches 58 for the answer push-button 43 are maintained in electrical circuit relationship with the speaker phone 30 by leads 90, and leads 91 serve to connect the microswitches to the terminal block 76. The remaining microswitches 58 also are connected across the speaker phone leads 90 to connect the speaker phone with the remote location in response to actuation of the corresponding push-button. The circuit additionally includes a bell 92 or other signalling device with is connected to the terminal block.

With the communications station properly positioned on the wall, a user desiring police assistance, for example, merely needs to depress the call-push button 40. The depressed button contacts the body portion 48 to bring the button to a dead-stop position and thereby prevent the button from being pushed into the interior of the enclosure 10. The button 40 actuates the corresponding microswitches 58 to place the speaker phone 30 on the line and to apply a current pulse to the automatic signalling unit 70. The unit 70 thereupongenerates an output signal at the remote location 80 corresponding to the calling number of the police. The output signal is generated only during the time the push-button 40 is held in its operative position, and upon the release of the button the biasing spring 52 (FIG. 3) automatically disconnects the circuit. Thus, should the caller leave or terminate the call before its completion the circuit automatically is rendered inactive.

The information call push-button 41 and the red cap call push-button 42 operate in similar fashion to place calls to the appropriate remote location. The corresponding signalling unit 71 or 72 produces the appropriate output signal at the remote location only during the time the push-button is held in its operative position in the manner described above.

Should the remote location 80 desire to contact the communications station, a signal is applied to the bell 92 to alert the station of the incoming call. To respond to the call the answer push-button 43 is depressed to place the speaker phone 30 on the line and establish communication. Upon the release of the answer push-button it automatically returns to its inoperative position to disconnect the speaker phone.

In the illustrated embodiment of the invention the flat plate 12 on the enclosure 10 extends a short distance from the wall 18 to provide room for the various internal components. In other advantageous embodiment the components may be recessed within the wall, and in these latter embodiments the enclosure may comprise a rectangular flat plate without the need for the sloping sides 13. The edges of the plate advantageously may be beveled to further improve the vandal-resistant characteristics of the station and to provide a flush-mounted appearance.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention.

What is claimed is:

1. A vandal-resistant communications station comprising, in combination:
   a face plate enclosure having a speaker aperture and at least one additional aperture therein;
   a push button assembly including a body portion disposed in the at least one additional aperture and a plunger carried in an opening in the body portion and moveable between an operative position and an inoperative position;
   means for resiliently sealing said plunger against the opening to prevent the insertion of foreign matter between the plunger and the opening;
   spring means for biasing said plunger to its inoperative position;
   switch means mounted within the face plate enclosure in position to be actuated by said plunger upon movement of the plunger to its operative position; and
   circuit means within the face plate enclosure in electrical circuit relationship with said switch means, the circuit means including an automatic signaling unit for producing an output signal at a remote location in response to actuation of the switch means when the plunger is held in its operative position.

2. A vandal-resistant communications station as defined by claim 1, the resilient sealing means comprising a pair of spaced O-rings around the plunger, and a layer of synthetic grease interposed between the O-rings.

3. A vandal-resistant communications station as defined by claim 1, wherein said circuit means is operative to discontinue said production of an output signal at a remote location upon movement of the plunger from its operative to its inoperative position.

4. A vandal-resistant communications station comprising, in combination:
   a face plate enclosure having a speaker aperture and a plurality of additional apertures therein;
   a call push-button assembly and an answer push-button assembly, each of said call push-button assembly and said answer push-button assembly including a corresponding body portion disposed in a respective one of said additional apertures and a respective plunger carried in an opening in the corresponding body portion and being moveable between an operative position and an inoperative position;
   means for resiliently sealing each of said plungers against the opening in its corresponding body portion to prevent the insertion of foreign matter between each plunger and its respective opening;
   spring means for biasing said plungers to their inoperative positions;
   first and second switching devices each in position to be actuated by a corresponding plunger of a respective one of said call push-button assembly and said answer push-button assembly upon movement of the respective plunger to its operative position; and
   circuit means mounted within the face plate enclosure in electrical circuit relationship with said switching devices, the circuit means including an automatic signaling unit associated with said call push-button assembly for producing an output signal at a remote location in response to actuation of the first switching device when the plunger of the call push-button assembly is moved to its operative position, the circuit means additionally including means for establishing communication from said remote location to said station in response to actuation of the second switching device when the plunger of the answer push-button assembly is moved to its operative position.

5. A vandal-resistant communications station as defined by claim 4, wherein said circuit means is operative to discontinue said production of an output signal at a remote location upon movement of the plunger of the call push-button assembly from its operative to its inoperative position.

6. A vandal-resistant communications station comprising, in combination:
   a one-piece face plate enclosure having a speaker aperature and plurality of additional apertures therein;
   a call push-button assembly and an answer push-button assembly, each of said call push-button assembly and said answer push-button assembly including a corresponding body portion disposed in a respective one of said additional apertures and a respective plunger carried in an opening in the corresponding body portion and being moveable between an operative position and an inoperative position;
   means for resiliently sealing each of said plungers against the opening in its corresponding body portion to prevent the insertion of foreign matter between each plunger and its respective opening;
   spring means for biasing said plungers to their inoperative positions;
   first and second switching devices each in position to be actuated by a plunger of a respective one of said call push-button assembly and said answer push-button assembly upon movement of the respective plunger to its operative position;
   circuit means mounted within the face plate enclosure in electrical circuit relationship with said switching devices, the circuit means including an automatic signaling unit associated with said call push-button assembly for producing an output signal at a remote location in response to actuation of the first switching device when the plunger of the call push-button assembly is moved to its operative position, the circuit means additionally including means for establishing communication from said remote location to said station in response to actuation of the second switching device when the plunger of the answer push-button assembly is moved to its operative position; and
   a signal unit within the faceplate enclosure for alerting the communications station of an incoming call.

7. A vandal-resistant communications station as defined by claim 6, in which the faceplate enclosure is of truncated configuration with sloping side portions.

8. A vandal-resistant communications station as defined by claim 6, wherein said circuit means is operative to discontinue said production of an output signal at a remote location upon movement of the plunger of the call push-button assembly from its operative to its inoperative position.

9. A vandal-resistant communications station as defined by claim 6, in which the face plate enclosure is of rigid metallic material.

10. A vandal-resistant communications station as defined by claim 9, which further comprises:

indicia means engraved on the face plate enclosure adjacent each of said push-button assemblies for denoting the function thereof.

11. A vandal-resistant communications station comprising, in combination:
- a one-piece face plate enclosure of rigid metallic material having a speaker aperture and a plurality of additional apertures therein;
- a plurality of call push-button assemblies and an answer push-button assembly respectively carried in said additional apertures, each of said call push-button assemblies and said answer push-button assembly including a corresponding body portion disposed in a respective one of said additional apertures and a corresponding plunger carried in an opening in the corresponding body portion and being moveable between an operative position and an inoperative position;
- means for resiliently sealing each of said plungers against the opening in its corresponding body portion to prevent the insertion of foreign matter between each plunger and its respective opening;
- spring means for biasing said plungers;
- a plurality of micro-switch assemblies, each corresponding with a respective plunger of one of the call push-button assemblies and the answer push-button assembly, in position to be actuated thereby upon movement of the plunger to its operative position;
- circuit means mounted within the face plate enclosure in electrical circuit relationship with said micro-switch assemblies, the circuit means including a plurality of automatic signaling units each corresponding with a respective micro-switch assembly associated with a corresponding plunger, for producing an output signal at a remote location in response to actuation of the respective micro-switch assembly when plunger of the corresponding call push-button assembly is moved to its operative position, the circuit means additionally including means for establishing communication from said station to said remote location upon receipt of a call from said remote location by actuating a respective micro-switch assembly upon movement of the plunger of the answer push-button assembly to its operative position;
- a signal unit within the face plate enclosure for alerting the communications station of an incoming call; and
- indicia means engraved on the face plate enclosure adjacent each of said push-button assemblies for denoting the function thereof.

12. A vandal-resistant communications station as defined in claim 11, wherein the resilient sealing means for each of said plungers comprises a pair of spaced O-rings around a respective one of each of said plungers, and a layer of synthetic grease interposed between the O-rings.

13. A wall-mounted vandal-resistant communications station as defined by claim 11, which further comprises:
- a mounting bracket permanently secured to the wall;
- only a single fastener for affixing the face plate enclosure to the mounting bracket; and
- means positioned in overlying relationship with said single fastener for preventing access thereto.

14. A vandal-resistant communications station as defined in claim 11, wherein said circuit means is operative to discontinue communications with said remote location after receipt of a call therefrom upon movement of said plunger of the answer push-button assembly to its inoperative position from its operative position.

15. A vandal-resistant communications station comprising, in combination:
- a face plate enclosure having a speaker aperture and a plurality of additional apertures therein;
- a plurality of call push-button assemblies and an answer push-button assembly respectively carried in said additional apertures, each of said call push-button assemblies and said answer push-button assembly including a corresponding body portion disposed in a respective one of said additional apertures and a respective plunger carried in an opening in the corresponding body portion and moveable between respective operative and inoperative positions;
- means for resiliently sealing each of said plungers against the opening in its corresponding body portion to prevent the insertion of foreign matter between each plunger and its respective opening;
- spring means for biasing said plungers to their inoperative positions;
- a plurality of switching devices, each corresponding with a respective plunger of one of the call push-button assemblies and the answer push-button assembly, in position to be actuated thereby upon movement of the plunger to its operative position;
- circuit means carried by the face plate in electrical circuit relationship with said switching devices, the circuit means including a plurality of automatic signaling units each corresponding with a respective switching device associated with a corresponding plunger, for producing an output signal at a remote location in response to actuation of the respective switching device when the corresponding plunger of the call push-button assembly is moved to its operative position, the circuit means additionally including means for establishing communication from said station to said remote location upon receipt of a call from said remote location by actuating the corresponding one of said plurality of switching devices upon movement of the plunger of the answer push-button assembly to its operative position; and
- a signal unit within the face plate for alerting the communications station of an incoming call.

16. A vandal-resistant communications station as defined in claim 15, wherein said circuit means is operative to discontinue said production of an output signal at a remote location upon movement of said plunger of the call push-button assembly to its inoperative position and said circuit means is further operative to discontinue communication with said remote location after receipt of a call therefrom upon movement of said plunger of the answer push-button assembly to its inoperative position from its operative position.

17. A vandal-resistant communications station comprising, in combination:
- a metallic face plate having a speaker aperture and a plurality of additional apertures therein;
- a plurality of call push-button assemblies and an answer push-button assembly respectively carried in said additional apertures, each of said call push-button assemblies and said answer push-button assembly including a corresponding body portion disposed in a respective one of said additional apertures and a corresponding plunger carried in an opening in the corresponding body portion and being moveable between an operative position and an inoperative position;

means for resiliently sealing each of said plungers against the opening in its corresponding body portion to prevent the insertion of foreign matter between each plunger and its respective opening;

spring means for biasing said plungers to their inoperative positions;

a plurality of switching devices, each corresponding with a respective plunger of one of the call push-button assemblies and the answer push-button assembly, in position to be actuated thereby upon movement of the respective plunger to its operative position;

circuit means carried by the face plate in electrical circuit relationship with said switching devices, the circuit means including a plurality of automatic signaling units each corresponding with a respective switching device associated with a corresponding plunger, for producing an output signal at a remote location in response to actuation of the respective switching device when the corresponding plunger of the call push-button assembly is moved to its operative position, the circuit means additionally including means for establishing communication from said station to said remote location upon receipt of a call from said remote location, by actuating a respective one of said plurality of switching devices upon movement of the plunger of the answer push-button assembly to its operative position; and indicia means engraved on the faceplate adjacent each of said push-button assemblies for denoting the function thereof.

18. A vandal-resistant communications station as defined in claim 17, wherein said circuit means is operative to discontinue communication with said remote location after receipt of a call therefrom upon movement of said plunger of the answer push-button assembly to its inoperative position from its operative position.

19. A vandal-resistant communications station comprising, in combination:

a face plate enclosure having a speaker aperture and a plurality of additional apertures therein;

a plurality of call push-button assemblies and an answer push-button assembly respectively carried in said additional apertures, each of said call push-button assemblies and said answer push-button assembly including a corresponding body portion disposed in a respective one of said additional apertures and a corresponding plunger carried in an opening in the corresponding body portion and being moveable between an operative position and an inoperative position;

means for resiliently sealing each of said plungers against the opening its corresponding body portion to prevent the insertion of foreign matter between each plunger and its respective opening;

spring means for biasing said plungers to their inoperative positions;

a plurality of switching devices, each corresponding with a respective plunger of one of the call push-button assemblies and the answer push-button assembly, in position to be actuated thereby upon movement of the plunger to its operative position; and circuit means mounted within the face plate enclosure in electrical circuit relationship with said switching devices, the circuit means including a plurality of automatic signaling units each corresponding with a respective switching device associated with a corresponding call push-button assembly, for producing an output signal at a remote location in response to actuation of the respective switching device when the corresponding plunger of the call push-button assembly is moved to its operative position, the circuit means additionally including means for establishing communication from said station to said remote location in response to actuation of the respective switching device when the plunger of the answer push-button assembly is moved to its operative position.

* * * * *